H. AND P. LARSEN.
ICE FISHING INDICATOR.
APPLICATION FILED MAY 24, 1921.
1,406,038.
Patented Feb. 7, 1922.
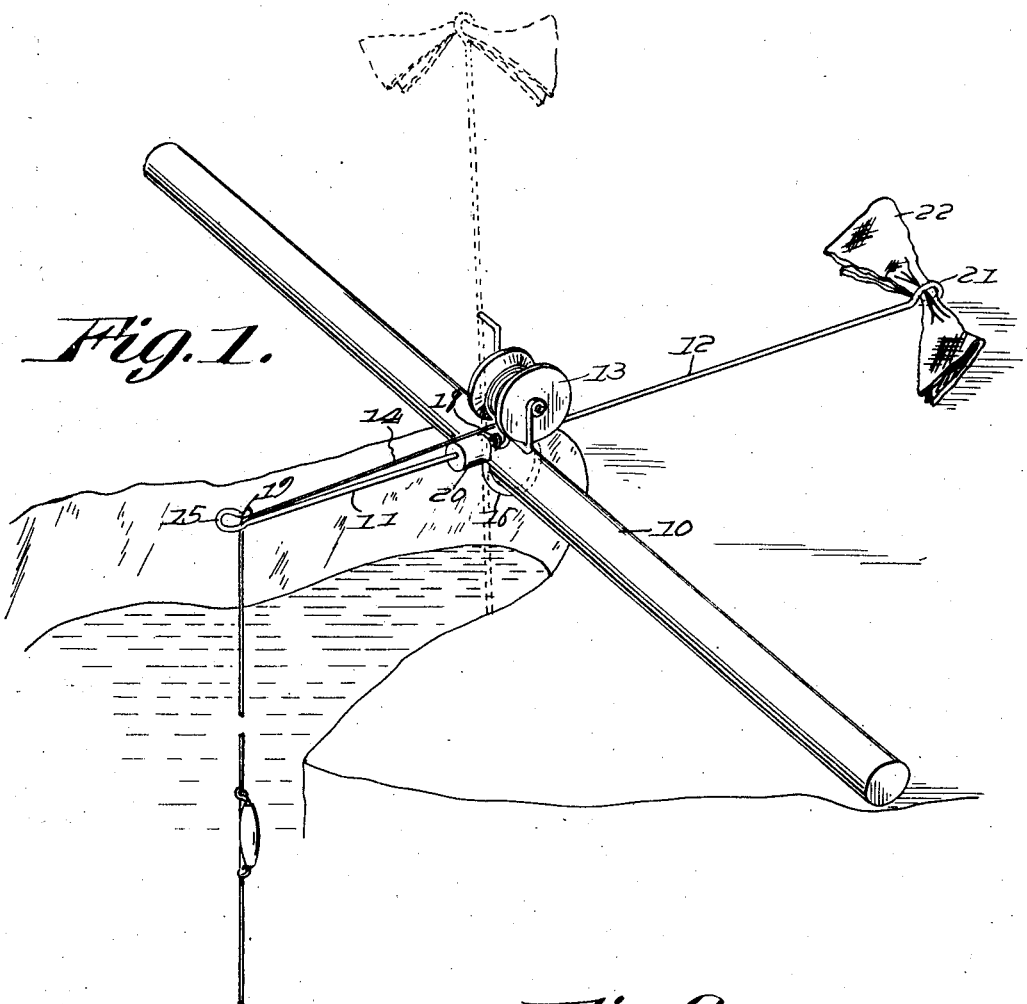
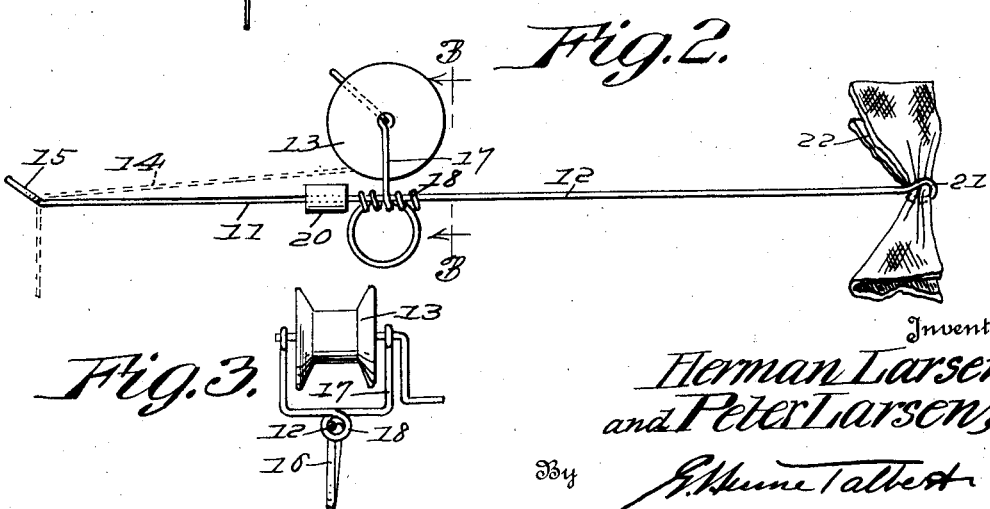
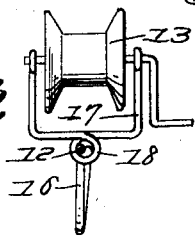
Inventors
Herman Larsen
and Peter Larsen,
By
Attorney

UNITED STATES PATENT OFFICE.

HERMAN LARSEN AND PETER LARSEN, OF LAKE VIEW, MICHIGAN.

ICE-FISHING INDICATOR.

1,406,038.  Specification of Letters Patent.  Patented Feb. 7, 1922.

Application filed May 24, 1921. Serial No. 472,159.

*To all whom it may concern:*

Be it known that HERMAN LARSEN and PETER LARSEN, citizens of the United States of America, residing at Lake View, in the county of Montcalm and State of Michigan, have invented new and useful Improvements in Ice-Fishing Indicators, of which the following is a specification.

The object of the invention is to provide a line supporting and strike indicating device for use in connection with ice fishing, or fishing operations conducted through holes in the ice, with a view to enabling the fisherman to control and operate a number of different lines under conditions affording a reasonable assurance of the effective hooking and landing of the majority of the fish which take the bait; and with this object in view the invention consists in a construction and combination of parts of which a preferred embodiment is shown in the accompanying drawings, wherein:

Figure 1 is a perspective view of a fishing apparatus embodying the invention.

Figure 2 is a side view of the same.

Figure 3 is a detail view of the reel showing the same from the direction indicated by the line 3—3 of Figure 2.

The apparatus consists essentially of a rocker or roller 10 which may be represented by a substantially round bar or rod of wood or metal of a length adapted to span the opening formed in the ice as indicated in Figure 1, with line holding and indicator arms 11 and 12 extending oppositely and substantially diametrically therefrom with a line reel 13 supported adjacent to the roller or rocker, the line 14 extending from the reel through a running eye 15 at the extremity of the line carrying arm 11.

The apparatus, aside from the rocker or roller and the reel may be constructed of wire with a single strand forming the arms 11 and 12 coiled at an intermediate point to form the loop 16 for engagement with the roller bar, and with reel holding arms 17 coiled as at 18 around the main wire adjacent to the loop 16. The reel is preferably of a simple form adapted to run freely and thus pay out the line as drawn by a fish feeding at the bait.

The running eye 15 preferably consists of a hook reduced at its inner side to form a line engaging seat 19 in which the line may be engaged when the apparatus is set as shown in Figure 1 to support lines against running out beyond a depth to which it is deemed proper to set the apparatus, it being understood, however, that upon the attack of the bait by a fish the slight draft upon the line occasioned by the pull of the fish will turn the rocker or roller to position the line carrying arm and indicator arm 12 in the upright position indicated in dotted lines in Figure 1, to thereby disengage the line from the seat 19 and permit the line to run freely with the movements of the fish.

Carried by the line supporting arm is a counterweight 20 freely slidable on said arm and normally placed when the apparatus is set in a position close to the rocker but adapted to slide toward the free end of the line arm when the rocker is tilted by the draft occasioned when a fish attacks the bait, so that after the apparatus has been moved to the indicating position by the action of the fish it is retained in such position by the shifting of the counterweight. The indicator arm is looped or hooked at its extremity as shown at 21 to engage a signalling device or flag 22 which when elevated by the turning of the rocker serves as an indication to the fisherman that a fish has attacked the bait of that line. Obviously upon receiving this notification the further operation of hooking and landing the fish depends as in other cases upon the skill of the fisherman, but owing to the free paying out of the line by reason of the adjustment of the parts when the bait is first attacked, it is possible for the fisherman to act deliberately and reserve the hook and jerk on the line until such time as in his judgment the fish is in a position to be properly hooked.

Having described the invention, what is claimed as new and useful is:

1. A fishing apparatus of the class described having a rocker for arrangement in spanning relation with an ice hole and carrying oppositely directed line guiding and indicator arms, the line guiding arm being provided with a terminal running eye for the line.

2. A fishing apparatus of the class described having a rocker for arrangement in spanning relation with an ice hole and carrying oppositely directed line guiding and indicator arms, the line guiding arm being provided with a terminal running eye for the line and said eye having a contracted seat for engagement by the line to limit the initial paying out thereof.

3. A fishing apparatus of the class described having a rocker for arrangement in spanning relation with an ice hole and carrying oppositely directed line guiding and indicator arms, the line guiding arms being provided with a terminal running eye for the line, a reel being arranged adjacent to the plane of the rocker and said running eye having a line seat for engaging and limiting the movement of the line when the apparatus is in its normal or set position.

4. A fishing apparatus of the class described having a rocker for arrangement in spanning relation with an ice hole and carrying oppositely directed line guiding and indicator arms, the line guiding arm being provided with a terminal running eye for the line, a counterweight being slidably mounted upon the line guiding arm for movement toward the extremity thereof when the rocker is tilted by a draft upon the line.

In testimony whereof they affix their signatures.

HERMAN LARSEN.
PETER LARSEN.